March 24, 1931.  C. C. BOARDMAN  1,797,256
THERMAL CONTROLLING SYSTEM
Filed Sept. 24, 1927   2 Sheets-Sheet 1
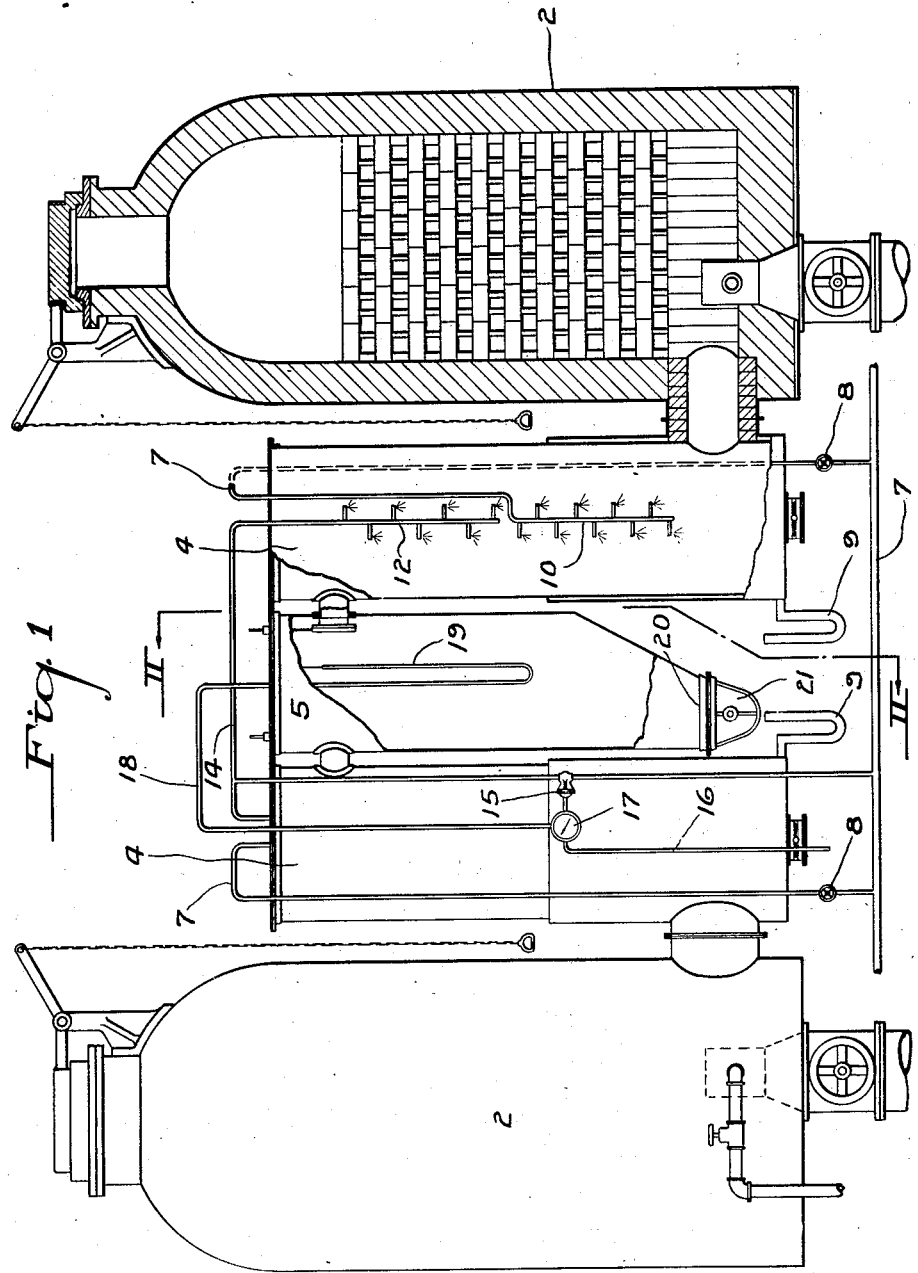

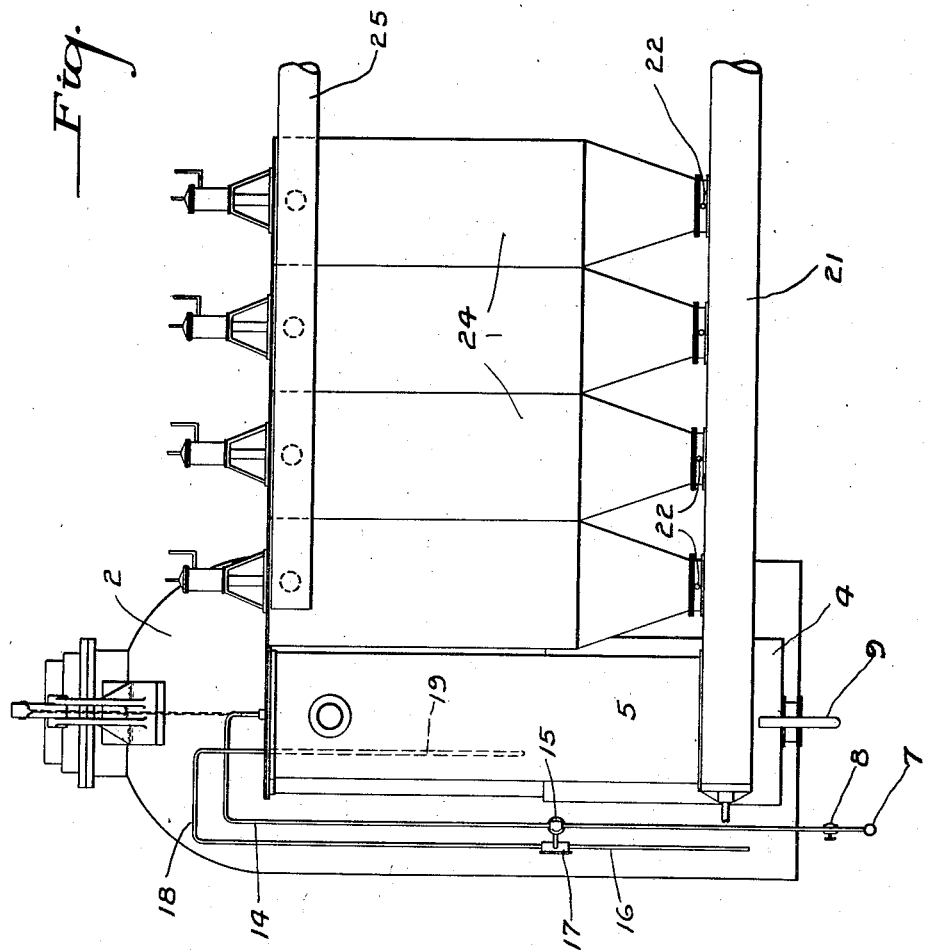

Patented Mar. 24, 1931

1,797,256

UNITED STATES PATENT OFFICE

CLARK C. BOARDMAN, OF STERLINGTON, LOUISIANA, ASSIGNOR TO THERMATOMIC CARBON COMPANY, OF MONROE, LOUISIANA, A CORPORATION OF DELAWARE

THERMAL CONTROLLING SYSTEM

Application filed September 24, 1927. Serial No. 221,719.

My invention relates to thermal controlling systems, and particularly to a system for controlling the temperature of gases generated in a plurality of furnaces and delivered to a gas treating device. In the handling of gases, gases are frequently derived from a plurality of sources and brought together in a mixing or receiving chamber before being delivered to a gas treating device. When the gases are received in the mixing chamber, they are frequently at different temperatures. As the temperature of the gases delievered to gas treating devices must be held within predetermined limits, it is necessary to provide a cooling system for the gases, either while in the mixing chamber or before delivered to it. Such a temperature control system should be controlled by the temperature of the gases in the chamber.

I provide a plurality of sources of gas each of which is provided with a primary cooling system. The primary cooling systems may be operated at substantially a constant rate of speed. The gases from the primary cooling system are passed into a mixing chamber. An auxiliary cooling system is provided that operates at a variable rate and supplements the effect of the primary cooling system upon the gases before entering the mixing chamber. Where the gases are cooled by spraying a fluid directly into them, it is possible to control the temperature of the gases by utilizing any one of a number of well-known thermal devices for the control of the secondary cooling system. One application of the present invention is to the apparatus and method for collecting carbon from gases shown and described in the patent to Brownlee and Uhlinger, No. 1,520,115 dated Dec. 23, 1924, and Uhlinger application Serial No. 108,482 dated May 12, 1926, although it is to be understood that the invention is applicable to other types of apparatus and processes. The term "gases" as used in the present specification, is understood to include a plurality of gases generated from distinct sources or a compound gaseous mixture generated from a plurality of generators having the same characteristics and mode of operation.

The accompanying drawings illustrate the present preferred embodiment of my invention, in which,—

Figure 1 is a diagrammatic view, partially in elevation and partially in section, of apparatus embodying my invention, and Figure 2 is an end view thereof, taken along the line 11—11 of Figure 1.

In practicing the invention, a plurality of furnaces 2 is provided, each having a cooling chamber 4 for receiving the gases generated. The cooling chambers 4 communicate with a common receiving or mixing chamber 5. Each cooling chamber 4 is provided with a primary cooling system connected to a fluid supply line 7 through a valve 8. Each chamber is provided with a sealed outlet 9 for removing excess fluid. The cooling fluid may be water or any chemical compound, depending upon the nature of the gases being treated.

In operation the valves 8 are normally left partially open and a continuous supply of cooling fluid is supplied to the chamber by sprays 10, in order that a sudden rush of hot gases into the chamber will be met by approximately a proper quantity of cooling fluid. In the event that no gas is traversing the chamber, the fluid escapes through the outlet 9, and if gas is traversing the chamber, an appreciable amount of the fluid is absorbed by the gas during the cooling operation. Since the gases entering the chamber 5 from the several chambers 4 may be of different temperatures, auxiliary or secondary sprays 12 are mounted in each chamber 4. The sprays 12 are connected by a pipe line 14 to a common regulating valve 15 and the source of fluid supply 7. The regulating valve 15 is operated by a pipe line 16 containing a fluid under pressure. One form of fluid is compressed air. The regulating valve is actuated by a pressure responsive device 17 connected by a pipe line 18 with a temperature control device 19 disposed in the chamber 5. The temperature control device 19 is here shown as of U-shape and is diagrammatic of any one of a number of temperature control devices now on the market.

When the temperature of the gases in the chamber 5 increases, the valve 15 is opened in response to the action of the temperature control device 19 and additional fluid is sprayed into the chambers 4. In the event that the temperature in the chamber 5 drops too low, the valve 15 is closed to diminish the quantity of fluid supplied by the secondary cooling system. While the present application illustrates the cooling of the chambers 4 by sprays, it is to be understood that the invention is equally applicable to devices that extract the heat from the cooling liquid without evaporation such, for example, as cooling coils.

The chamber 5 is provided with an outlet 20 at the bottom thereof which opens into a duct 21.

Referring to Figure 2, the duct 21 is connected by inlet valves 22 to a plurality of gas treating chambers 24 that discharge gases to a duct 25. One form of gas treating chambers is filters for removing particles of solid matter from the gases generated in the furnace 2. It is to be understood that the foregoing example is by way of illustration and is not a limitation of the invention. Since the action of the gas treating devices 24 varies in accordance with the humidity and temperature of the gases delivered thereto, it is highly important that the temperature of the chamber 5 be maintained at substantially a constant temperature irrespective of the sources from which the gases are initially derived.

It is to be understood that various changes may be made in the invention without departing from the scope of the appended claims.

I claim:

1. In combination, a plurality of sources of gases, a separate cooling chamber for cooling the gases from each source, primary cooling means associated with each cooling chamber, a common chamber for receiving the gases, a secondary cooling means associated with each of the first named cooling chambers, and means for controlling each of said secondary cooling means in accordance with the temperature of the common chamber.

2. In combination, a plurality of sources of gases, a cooling chamber for cooling the gases from each source, cooling means operable at substantially a constant rate associated with each chamber, a common chamber for receiving the gases, secondary cooling means operable at a variable rate associated with each cooling chamber, and means for controlling the secondary cooling means in accordance with the temperature of the common chamber.

3. In combination, a plurality of sources of gases, separate gas cooling means associated with each source, a common gas receiving chamber, and temperature responsive means for varying the effect of the several separate cooling means in accordance with the temperature of the gases in the common chamber.

4. In combination, a gas filter, a chamber for delivering gas to the filter, a plurality of sources of gas supplying gas to the chamber, separate gas cooling means associated with each source, and means for controlling the operation of the separate cooling means in accordance with the temperature of the gases in the chamber.

5. In combination, a generator of gases whose rates of discharge is subject to quick rises, a chamber for cooling the gases discharged from the generator, primary cooling means therein, a second chamber for receiving the gases from the cooling chamber, and auxiliary cooling means for the gases controlled in accordance with the temperature in the second chamber.

6. In combination, a plurality of sources of gases, a cooling chamber associated with each source of gases, separate cooling means disposed in each cooling chamber, a common receiving chamber for the gases, a filter supplied by gases from the receiving chamber, and means responsive to the temperature of the gases in the receiving chamber for at least in part controlling the operation of the cooling means in the several cooling chambers.

7. In combination, a plurality of sources of gases, a cooling chamber associated with each source of gases, separate cooling means disposed in each of the several cooling chambers, a common receiving chamber for receiving gases from the cooling chambers and delivering them to a filter, and thermo-responsive means disposed in the receiving chamber for controlling the cooling means to insure a predetermined temperature in the receiving chamber.

8. In combination, a plurality of sources of gases, a cooling chamber associated with each source of gases, a separate cooling means disposed within each cooling chamber, a common receiving chamber for the gases, and means comprising a thermo-responsive device in the receiving chamber for simultaneously controlling the effectiveness of a plurality of the cooling means in order to obtain a predetermined temperature in the receiving chamber.

9. In combination, a plurality of sources of gases, a cooling chamber associated with each source of gases, a separate cooling means having substantially a constant rate of operation and a separate cooling means having a variable rate of operation disposed in each cooling chamber, a common receiving chamber for the gases from the several cooling chambers, and means comprising a thermo-responsive device responsive to the temperature of the gases in the receiving chamber for controlling the effectiveness of the variable cooling means in order to obtain a predetermined temperature in the receiving chamber.

10. In combination, a generator of gases whose rate of discharge is subject to quick rises, a chamber for cooling the gases discharged from the generator, primary cooling means therein having a substantially constant rate of operation, a second chamber for receiving the gases from the cooling chamber, and auxiliary cooling means for the gases having a variable rate of operation, the rate of operation of said auxiliary cooling means being controlled in accordance with the temperature in the second chamber.

In testimony whereof I have hereunto set my hand.

CLARK C. BOARDMAN.